April 12, 1960 W. J. BERNARD ET AL 2,932,153
ELECTROLYTIC CAPACITOR AND METHOD OF MAKING
Filed July 29, 1957

WALTER J. BERNARD
MOUSHY MARKARIAN
& SIDNEY D. ROSS
*INVENTORS*

BY *Connolly + Hutz*

THIER ATTORNEYS

United States Patent Office 2,932,153
Patented Apr. 12, 1960

2,932,153
ELECTROLYTIC CAPACITOR AND METHOD OF MAKING

Walter J. Bernard, Moushy Markarian, and Sidney D. Ross, Williamstown, Mass., assignors to Sprague Electric Company, North Adams, Mass., a corporation of Massachusetts Application July 29, 1957, Serial No. 674,767

3 Claims. (Cl. 317—230)

The present invention relates to electrolytic capacitors of the type that use essentially non-aqueous electrolytes.

Prior electrolytic capacitors of the above type have suffered from disadvantages such as erratic behavior, and complications in the forming of the dielectric film on the anode.

Among the objects of the present invention is the provision of a novel capacitor which reduces the above difficulties.

Additional objects of the present invention include the provision of a novel method for forming the dielectric oxide films in a simpler manner.

The above as well as further objects of the present invention will be more fully understood from the following description of several of its exemplifications, reference being made to the accompanying drawing wherein.

Figure 1:
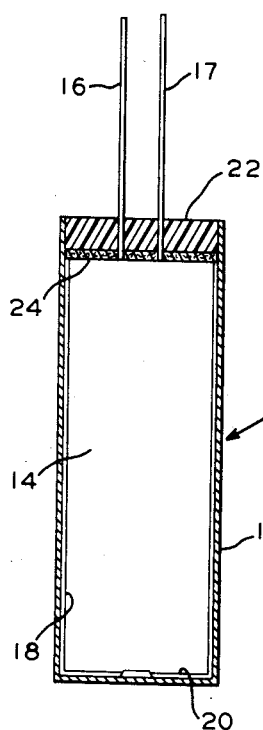
Fig. 1 is a longitudinal section view of one form of electrolytic capacitor representative of the invention.

According to the present invention an electrolytic capacitor has anode and cathode electrodes in contact with an electrolyte which is a solution of lower aliphatic amine salt of a lower aliphatic carboxylic acid and a lower aliphatic alcohol solvent containing from about ¼ to 2½% water based on the weight of the solution, the pH of the solution being from about 8 to 9.

The presence of the above amount of water enables the formation of a dielectric oxide film on a capacitor anode by anodic treatment in the above electrolyte at a relatively high voltage, e.g., up to 200 volts. In other words the anode cannot be formed in such an electrolyte if it is intended for use at a voltage higher than about 10–20, when the water content is outside the above range.

The alkaline condition of the solution provides more uniform operating characteristics, particularly at low temperatures and also gives relatively long life both in use as well as when not in use (shelf life).

The lower aliphatic amines used to form the salts of the present invention include primary, secondary and tertiary amines of alkyl groups having from 1 to 6 carbon atoms. These alkyl groups can be unsubstituted, but are desirably substituted with hydroxyl or similar radicals which lower the volatility of the amine without detracting from its utility in the final electrolyte. Substitution with halogens other than fluorine is not desirable, because of their corrosive action on the electrodes.

The acids can also have from 1 to 6 carbon atoms and can be either unsubstituted or substituted with fluorine or hydroxyl. The alcohols suitable for use with the invention include methanol, ethanol, n-propanol, n-butanol, and their various isomers, as well as dihydroxy and trihydroxy alcohols containing from one to four carbon atoms. Because of their much smaller volatility, polyhydroxy alcohols such as ethylene glycol and diethylene glycol are preferable.

The solute concentrations in accordance with the present invention can vary from 2 percent (calculated as the weight of salt divided by the total weight of the electrolyte) to the maximum limit of solubility. Concentrations of from 40 to 60 percent are preferred for general use with somewhat lower concentrations for use at extremely low temperatures.

Specific examples of some of the electrolytes of the present invention are as follows, all percentages being by weight:

*Example I*

49% ethanolamine trifluoroacetate
48½% ethylene glycol
½% water
2% ethanolamine (free)

The above electrolyte has a pH of 8.6, a specific resistivity of 210 ohm-centimeters at 25° C. It can be used to anodically form aluminum anodes at a potential as high as 175 volts at 65° C.

*Example II*

48% ethanolamine acetate
49% ethylene glycol
2% ethanolamine (free)
1% water

This electrolyte has a pH of 8.5, a specific resistivity of 420 ohm centimeters and will form aluminum anodes at up to 90 volts at 65° C.

*Example III*

5% propanol amine butyrate
93¾% propylene glycol
½% propanolamine (free)
¾% water

*Example IV*

10% monohexylamine glycolate
88% diethylene glycol
1% water
1% hexylamine (free)

The electrolytes of Examples III and IV have somewhat less stability and less conductivity than those of Examples I and II and are accordingly not as desirable. However, all of these electrolytes can be used in accordance with the present invention. Furthermore, for use in capacitors designed to operate at relatively low potential, e.g. 3 volts, they can be used as such or with the water content slightly below ¼ percent or slightly above 2½ percent (based on the weight of the solution).

Because of the low resistivities of the electrolytes of this invention, capacitors employing our electrolytes have improved power factor and capacity, especially at low temperatures. Life test results on ten capacitors having a rated value of 40 mfd. 3 volts D.C., constructed as hereinafter set forth and employing the electrolyte of Example I above, showed exceptional electrical properties. Average original values were: capacity, 46.0 mfd.; RC–158; leakage, 4.8 μa. After 1000 hours' life test at 3 volts and 65° C. the units had values of: capacity, 45.1 mfd.; RC–149; leakage, 0.5 μa.

Referring now to Fig. 1 there is here shown a capacitor 10 having a metal container 12 in which is housed a convolutely wound capacitor section 14 with terminal leads 16, 17 projecting out the open end of the tube 12. A paper spacer 18 is inserted between the section and the side of tube 12, another paper spacer 20 separates the lower end of the section from the floor of the tube. A plastic seal 22 covers the open end of the tube and seals the leads 16, 17 in place. As shown another spacer 24 of cardboard covers the upper end of section 14 and keeps the plastic seal 22 from running its way into the section.

Figure 2:
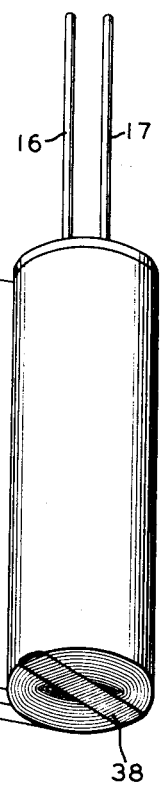
Fig. 2 is a pictorial view of the internal assembly of the capacitor of Fig. 1, the assembly being shown partially unwound; and, Fig. 3 is a view similar to Fig. 1 of a modified capacitor embodying the present invention.

The section itself is shown in greater detail in Fig. 2 as composed of an anode electrode foil 31, a cathode electrode foil 32, and porous spacers 33, 34. These four components are assembled and convolutely wound with sufficient turns so as to closely fit in the space provided by the housing. Anode foil 31 is a three mil thick aluminum foil, etched to an etch ratio of 8 when formed at maximum potential of 150 volts, by the process described in British Patent 715,525, published September 15, 1954. Foil 32 is a plain aluminum foil ½ mil thick. Spacers 33 and 34 are Benares paper three mils thick, and are wide enough to project beyond both side edges of the anode foil. Cathode foil 32 is, however, arranged to have one side edge indicated at 36 extend beyond all the other convolutely wound members. The opposite edge of foil 32 can be recessed so that the spacers project beyond it.

Before or during winding of the assembly, leads 16, 17 are connected to the respective foils as by being clamped to them. Each lead can, for example, be of wire that is longitudinally slit with the end of a foil inserted in the slit. Crimping of the wings of the slit portion against each other securely clamps the foil in place and makes good electrical contact with it. Such connection is particularly suited for the anode foil where good electrical contact is established notwithstanding the presence of a previously existing oxide layer. Good anode connections can also be made with a connecting tab made of soft annealed or hard tempered aluminum with punched out teeth that are pierced through the coated electrode foil, folded down against it and pressed into place. Other connection arrangements can also be used.

To reduce the inductance of the capacitor section, the turns of the foil can be directly interconnected as by a mashing operation. In Fig. 2 a groove 38 is shown as mashed into the edge 36 of the cathode foil for this purpose. The wound assembly can be immersed in a body of the electrolyte of Example I warmed to about 65° C. and after it is thoroughly saturated with electrolyte, its anode can be anodically formed by connecting a 175 volt D.C. electric power supply to the leads 16, 17 and continuing to pass current through the section until the current drops to one microampere per microfarad. A resistor can be inserted in series in the electric forming circuit to limit the forming current to not over one ampere per microfarad.

The formed section is then inserted into the tubular housing and sealed in place as by using a prepelleted epoxy resin seal 22 as described in copending U.S. patent application Serial No. 557,091, filed January 3, 1956. Leads 16, 17 of aluminum are suitable for use in plug-in type connections. For soldering the aluminum leads can be dip-coated with aluminum solder such as an alloy of 95 percent zinc and 5 percent aluminum, or can be burnished with lead-tin solder as described in Chemical and Engineering News issue of January 30, 1956, page 498 et seq.

The combination of the present invention can be used with anodes that are not etched, and are in configurations other than the foil shown in Figs. 1 and 2. In addition metals other than aluminum can be used for the anode. Tantalum or columbium are for example suitable anodes.

Figure 3:
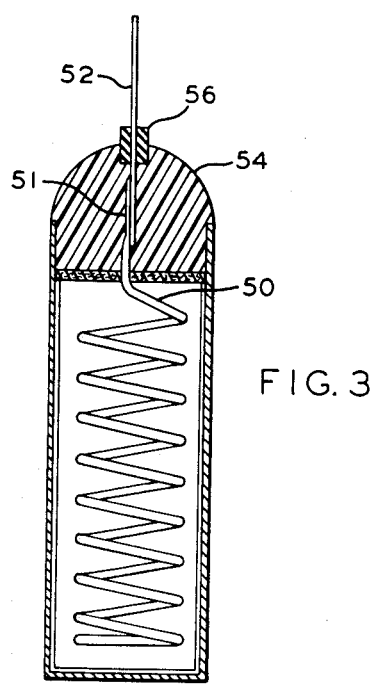

Fig. 3 shows a modified form of capacitor in accordance with the present invention where the anode is a wire 50 coiled to conserve space and sealed in a tubular housing in a manner similar to that of the construction of Fig. 1. Here, however, the wire 50 is lap-welded at a flattened end 51 to a terminal lead 52 of copper or nickel, the welded joint being embedded in the end seal 54. In addition a plug 56 of neoprene rubber is threaded over the lead 52 and pushed into the seal 54 before the seal hardens, to reduce lead breakage on flexing where the lead is relatively a small diameter wire. In relatively high capacitance constructions of the type of Fig. 3 having a housing used as a cathode electrode, the internal surface of the housing is desirably platinized, roughened or treated some other way to increase its apparent surface, as described in the copending U.S. patent application Serial No. 354,814, filed May 13, 1953.

A feature of the present invention is that high quality capacitors are provided using anodes that may be formed in the same electrolytes which are impregnated in the final capacitor. In addition the resulting capacitors are suitable for continuous operation at temperatures from minus 60° C. and as high as plus 100° C. With the more volatile solvents such as ethanol, high temperature operation generates a very large internal pressure, and the housings should then be built to withstand such pressures, as by mechanically crimping the open end of the housing against a preformed phenol-formaldehyde sealing plug. For operation at a potential of 100 volts or higher, it is desirable to provide venting means to permit the escape of gases that may be generated in operation. Such venting is readily built in by merely leaving the seal a little loose around the leads, for example. Athough some moisture may evaporate from the electrolyte through any venting arrangement, such loss is not material inasmuch as the amount of moisture specified above is primarily useful for the forming operation and need not be present in the final capacitor. In fact, with the more hygroscopic forms of electrolyte, some moisture may even be absorbed from the atmosphere through the venting arrangement without untoward results.

As explained above, the electrolyte has the longest life when its pH is between 8 and 9, preferably from 8.5 to 8.7. A pH above 9 reduces the life both on the shelf as well as in use by dissolution of the oxide film. A pH below 8 will also cause a reduction in life, but not quite as abruptly, by failure to properly form the oxide film.

Since the term pH in its classical sense should be restricted to water solutions, and not extended to glycol solutions, it should be understood that the term pH as used in this application means the apparent pH of the solution when measured with a glass electrode.

The optimum water content of the electrolyte for formation varies slightly with different salts and different solvents. For the combination of Exampe I, the best results are obtained at from 0.5 to 1% based on the weight of the solution. On the other hand, the water content of the combination of Example II has a wider optimum that extends from 0.5 to 2.0%. However, the less preferred ¼ to 2½% limits will be generally applicable to all the combinations.

Obviousy many modifications and variations of the present invention are possible in the light of the above teachings. It is, therefore, to be understood that within the scope of the appended claims the invention may be practiced otherwise than as specifically described.

What is claimed is:

1. An electrolytic capacitor having anode and cathode electrodes in contact with an electrolyte, the electrolyte consisting essentially of a solution of a lower aliphatic amine salt of a fluorinated lower aliphatic carboxylic acid in a lower aliphatic alcohol solvent containing from about ¼ to 2½ percent water based on the weight of the solution, the pH of the solution being from about 8 to 9.

2. The method of forming a dielectric oxide film on an electrolytic capacitor anode, said method being characterized by the anodic treatment of the anode in a solution consisting essentially of an aliphatic amine salt of a fluorinated lower aliphatic carboxylic acid in a lower aliphatic alcohol containing from about ¼ to 2½ percent water, based on the weight of the solution, the pH of the solution being from 8 to 9.

3. The combination of claim 1 in which the electrolyte is a 50 percent by weight solution of ethanolamine trifluoroacetate in ethylene glycol containing from 0.5 to 1 percent water based on the weight of the solution, and the electrolyte has a pH of about 8.6.

References Cited in the file of this patent
UNITED STATES PATENTS

| | | |
|---|---|---|
| 2,036,669 | Yngve | Apr. 7, 1936 |
| 2,084,046 | Owen | June 15, 1937 |
| 2,759,132 | Ross | Aug. 14, 1956 |
| 2,871,425 | Burnham | Jan. 27, 1959 |